Patented Feb. 16, 1932

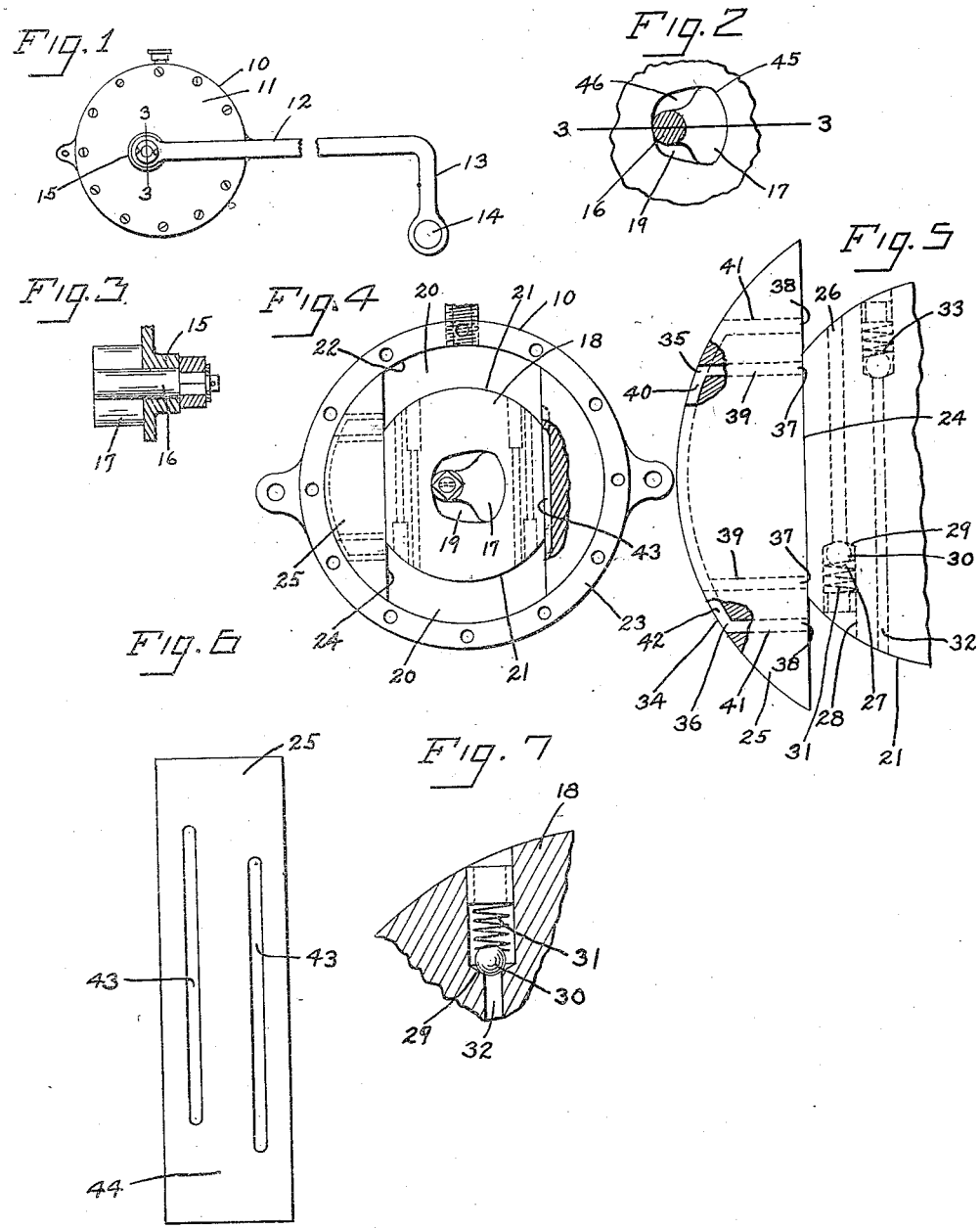

1,845,504

UNITED STATES PATENT OFFICE

HARRY E. LENT, OF SOUTHINGTON, CONNECTICUT, ASSIGNOR OF ONE-HALF TO ALBERT R. THOMSON, OF DERBY, CONNECTICUT

HYDRAULIC SHOCK ABSORBER

Application filed March 23, 1929, Serial No. 349,435. Renewed January 21, 1931.

My invention relates to improvements in hydraulic shock-absorbers for use in cooperation with the axles of automobiles generally in the usual manner, involving the use of individual devices with the end portions of said axles, and the object of my improvement is to produce a hydraulic shock-absorber that is relatively simple in construction, that is economical to construct, that is efficient under conditions of use, and that is adapted to be constructed and arranged to be operative to cushion the relatively violent and excessive axle movements and permitting of the vehicle springs to function for cushioning the moderate vibrations or the like, whereby such springs may be lighter and easier riding than the springs in common use.

In the accompanying drawings:—

Figure 1 is a diagrammatic side elevation showing my improved hydraulic shock-absorber and the actuating lever therefor.

Figure 2 is an inside view of the actuating cam on said actuating lever, on an enlarged scale.

Figure 3 is a fragmentary sectional view on the line 3—3 of Fig. 1 showing the bearing for the cam, the connection thereof with the actuating lever, and the bearing-boss on the cover.

Figure 4 is a side elevation on an enlarged scale of the shock-absorber structure with the cover removed.

Figure 5 is a view on a still further enlarged scale showing the left side guide members with the by-pass ducts therein and the adjacent portion of the piston member.

Figure 6 is a view of the bearing face of the right side guide member, showing the bearing passage grooves therein.

Figure 7 is a sectional view showing details of one of the ball check valves.

My improved hydraulic shock-absorber comprises mechanism that is housed within a casing 10 of cylindrical form and is provided with a cover 11 and which mechanism is actuated through the medium of a lever 12. The outer end portion 13 of said actuating lever 12 is positioned so as to be moved to and fro in a vertical plane responsive to the up and down movements of the axle 14 of the automobile with which the shock-absorber is operatively connected.

The cover 11 is provided with a boss 15 that is bored to provide a bearing for the short bearing portion 16 that is connected to the actuating shaft or lever 12 and at the inner end of said bearing portion 16 or branch arm 16 is a generally laterally-directed actuating cam 17 that serves as the drive connection for the shock-absorber mechanism.

Said mechanism comprises a piston member 18 and there is provided therein an opening 19 that is a working or operative fit for the cam 17, whereby as the actuating lever 12 is oscillated there is a corresponding movement of said piston member 18. Thus, under conditions of use the piston member 18 is moved to a limited extent to and fro within the casing 10, and such movement may follow to a large extent along an arc of a circle.

The piston member 18 is shorter than the diameter of the inside of the casing 10 so that under normal conditions there is a space 20 between each end face 21 and the opposed inside face 22 of the border wall 23 of said casing 10, and which spaces 20 are filled with oil. Ducts of different kinds or forms permit of flow of liquid from one end space 20 to the other under certain conditions of use to be described and the ducts that are located in the piston are provided with check means, as will be described.

The piston member 18 has flat sides 24 for guiding and for cooperating with said sides 24 there are provided side guide members 25.

Said ducts comprise two main ducts 26 that are located one each adjacent the sides 24 of the piston member 18 and in parallelism therewith. Said ducts are relatively large, so as to permit of more free flow therethrough than through other ducts to be described, and each thereof is provided with a check valve 27 of the ball-and-spring form, as is in common use in different arts. Housing of the check valve 27 involves the use of an enlarged bore 28 and this is conveniently provided adjacent the end of the particular duct 26. The seat 29 for the ball 30 is located at the junction of the enlarged bore 28 and the duct 26 and the spring 31 is located outwardly relatively to said ball 30 and seat 29. The two valves 27 are located adjacent the opposite ends of the piston member 18. That is to say, the check valve 27 for one duct 26 is adjacent one end face 21 of the piston member 18 and the check valve 27 for the other duct 26 is adjacent the other end face 21.

Thus with a movement of the piston member 18 along the side guides 25, involving displacement of liquid, one check valve is closed by the resulting liquid pressure and the other check valve is opened, so that the major portion of the piston member operates to drive the opposed liquid and there is relief through the one main duct 26 in which the check valve 27 will be opened by the liquid pressure.

In some cases additional ducts may be desired through the piston member, such as the ducts 32 of smaller size than the ducts 26, and each of which is provided with a ball-and-spring check valve. As shown, the auxiliary ducts 32 are located each closely adjacent one of the main ducts 26.

The check valves 33 for the auxiliary ducts 32 are preferably arranged to operate contrary to the check valve 27 of its adjacent main duct 26.

Thus relief for the flow of liquid from one end space 20 to the other will be provided by one of the auxiliary ducts 32 in addition to the one main duct 26.

As stated, the casing 10 is of cylindrical form. The inner face 22 of the border wall 23 is finished to serve as a bearing and the side guides 25 have their peripheries 34 finished to cooperate therewith. This arrangement permits the said side guides 25 to slide to and fro in a rotative movement as the piston member 18 is moved along the space between the two side guides 25. This detail permits the piston member to respond freely to the to and fro movements of the actuating lever so that the liquid housed within the casing can be utilized to effect the checking of such movement.

In some cases it may be desirable to utilize the checking or shock-absorbing effect described only for cushioning abnormal shocks or the like and to relieve the springs against these only, thus permitting the springs to effect the cushioning of the relatively moderate vibrations. In order to do this there must be permitted relatively free flow for short movements of the piston member 18. This result is attained by the provision of by-passes in one of the side guides 25, the ports of which can be covered after the desired movement of the piston member 18.

As shown, two by-passes are provided in the side guide 25, respectively the inner pass 35 and the outer pass 36. The inner by-pass 35 has ports 37 that open close to the end faces 21 when in the medial position and the ports 38 for the outer by-pass 36 are farther apart.

The ports 37 and 38 are at different elevations, so that the inter-connecting passages between each pair thereof will not conflict one with the other. Various ways may be utilized for providing said passages. As shown, a drilled hole extends outwardly through the material of the side guide member to the periphery 34 in each case and the outer ends of said drilled holes are connected by means of a groove that extends along said periphery 34. Said grooves are closed on the outside by means of the opposed portion of the inside face 22 of the casing wall 23.

Thus in the case of the two ports 37 the drilled holes 39 extend outwardly from the ports and are connected by the peripheral groove 40, the passage 35 composed of these elements being closer to the cover than the passage 36. Said passage or by-pass 36 is similarly composed of the two drilled holes 41 and the peripheral groove 42. The ports 37 are located so that a slight movement of the piston member 18 one way or the other will cover and close one thereof and thereby check free flow of oil from one side or end of the piston member to the other through the by-pass 35 and a somewhat further movement will stop the flow through the by-pass 36. At this stage further movement of the piston member will be cushioned by the functioning of the checking means described, involving restricted flow through the ducts 26 and 32.

By the construction described lighter vehicle springs can be used and these will effect the cushioning for the ordinary moderate vibrations of the axle relatively to the vehicle body and in the case of a relatively violent jolt the shock-absorber structure will function.

In the structure so far described provision is made by the by-passes 35 and 36 in the side guide 25, the latter being located at the left side of the casing in Fig. 4, for relatively small movements of the internal mechanism without cushioning effect and for cushioning during the larger movements. In some cases it may be desirable to provide some relief for the piston movement intermediate the initial movement and the final movement in which the piston approaches more or less closely to the cylinder wall, involving during a portion of the piston throw the opening or uncovering of a relief passage port that connects for permitting flow around the piston. Such a passage is provided in the right side guide 25 for each direction of the piston movement. One end or the port of each passage is normally covered by the piston 18 and the passage extends for each thereof outwardly beyond the piston, one at each side, as mentioned. After the prescribed extent of movement of the piston both ends or ports of the passage are uncovered and free flow of oil is permitted from one end of the piston to the other.

In the structure shown the relief passages 43 are provided by grooves in the side face 44 and these are operatively closed by the opposed face 24 of the piston 18. The two passages or grooves 43 are at different elevations in the thickness of the piston.

Considering the drive cam 17 and the opening 19, these parts are closely fitted at the drive-end 45 and at the other end, adjacent the bearing shaft 16, there is normally free space 46 on each side, so that the necessary amount of free play is permitted for the full desired movement of the piston to one side or the other.

I claim as my invention:—

1. In a hydraulic shock-absorber, a casing enclosing a chamber for housing oil and having a cylindrical inner face for the enclosing side wall, a driving arm adapted to be operatively connected to the axle of an automobile and having a branch that projects through one of the side walls of said casing and has bearing engagement with the opposed portion of said side wall, mechanism housed within said casing and operatively connected with said branch, said mechanism comprising a piston member that is moved generally in an arcuate path responsive to rotative movement of said branch and that has flat straight side faces on opposite sides, the ends of said piston member being spaced from the opposed portions of said cylindrical inner face, side guide members of segmental form having flat straight faces on each side of said piston member with the opposed faces in sliding engagement and having the peripheral faces in sliding engagement with said inner cylindrical face, a set of oil ducts extending longitudinally through said piston member, and a check valve located in each of said ducts.

2. In a hydraulic shock-absorber as described in claim 1, a by-pass for oil connecting the oil spaces at the two ends of said piston member, located in one of said side guide members, having ports that open through the flat face thereof, and with said ports located so as to be covered by movement of the piston member one way or the other.

HARRY E. LENT.